(12) United States Patent
Leusner et al.

(10) Patent No.: US 6,210,720 B1
(45) Date of Patent: Apr. 3, 2001

(54) CALCIUM FORTIFIED CEREAL PRODUCT AND METHOD OF PREPARATION

(75) Inventors: Steven J Leusner, Orono; Dean W Creighton, Brooklyn Park, both of MN (US)

(73) Assignee: General Mills, Inc., Minneapolis, MN (US)

(*) Notice: Subject to any disclaimer, the term of this patent is extended or adjusted under 35 U.S.C. 154(b) by 0 days.

(21) Appl. No.: 09/401,207

(22) Filed: Sep. 22, 1999

(51) Int. Cl.[7] ........................................................ A23L 1/304
(52) U.S. Cl. ........................... 426/74; 426/271; 426/619; 426/620; 426/621
(58) Field of Search ............................. 426/74, 619, 620, 426/621, 271

(56) References Cited

U.S. PATENT DOCUMENTS

| | | |
|---|---|---|
| 1,163,175 | 12/1915 | Bullman . |
| 2,098,544 | 11/1937 | Hill . |
| 2,166,797 | 7/1939 | Collatz . |
| 2,239,543 | 4/1941 | Andrews et al. . |
| 2,600,532 | 6/1952 | Hale et al. . |
| 2,707,153 | 4/1955 | Bettman . |
| 2,743,685 | 5/1956 | Hale et al. . |
| 2,788,277 | 4/1957 | Huber . |
| 3,557,718 | 1/1971 | Chivers . |
| 3,565,559 | 2/1971 | Sato et al. . |
| 3,615,676 | 10/1971 | McKown et al. . |
| 3,620,762 | 11/1971 | Yoshida et al. . |
| 3,622,344 | 11/1971 | Allingham . |
| 3,726,693 | 4/1973 | Harris . |
| 3,764,343 | 10/1973 | Paugh . |
| 3,814,822 | 6/1974 | Henthorn et al. . |
| 3,878,305 | 4/1975 | Damico et al. . |
| 3,952,115 | 4/1976 | Damico et al. . |
| 4,079,151 | 3/1978 | Schade et al. . |
| 4,089,984 | 5/1978 | Gilbertson . |
| 4,338,339 | 7/1982 | Edwards . |
| 4,378,377 | 3/1983 | Gajewski . |
| 4,497,840 | 2/1985 | Gould et al. . |
| 4,540,587 | 9/1985 | Gajewski . |
| 4,614,657 | 9/1986 | Sheng et al. . |
| 4,702,925 | 10/1987 | Verrico . |
| 4,755,390 | 7/1988 | Calandro et al. . |
| 4,856,453 | 8/1989 | Verrico . |
| 4,857,339 | 8/1989 | Maselli et al. . |
| 4,859,477 | 8/1989 | Augustine et al. . |
| 4,880,645 | 11/1989 | Carpenter et al. . |
| 4,906,482 | * 3/1990 | Zemel ................................. 426/74 |
| 4,988,521 | 1/1991 | Fan . |
| 4,994,283 | * 2/1991 | Mehansho .......................... 426/74 |
| 5,005,514 | 4/1991 | Verrico . |
| 5,023,024 | 6/1991 | Kyogoku et al. . |
| 5,093,146 | 3/1992 | Calandro et al. . |
| 5,258,187 | 11/1993 | Shimada . |
| 5,270,063 | 12/1993 | Wullschleger et al. . |
| 5,275,831 | 1/1994 | Smith et al. . |
| 5,306,519 | 4/1994 | Peterson et al. . |
| 5,449,523 | 9/1995 | Hansen et al. . |
| 5,510,130 | 4/1996 | Holtz et al. . |
| 5,516,541 | 5/1996 | Breslin et al. . |
| 5,645,878 | 7/1997 | Breslin et al. . |
| 5,695,805 | 12/1997 | Borek et al. . |
| 5,698,252 | 12/1997 | Kelly et al. . |
| 5,707,448 | 1/1998 | Cordera et al. . |
| 5,709,902 | 1/1998 | Bartolomei et al. . |
| 5,798,132 | 8/1998 | Chen et al. . |

\* cited by examiner

*Primary Examiner*—Helen Pratt
(74) *Attorney, Agent, or Firm*—John A. O'Toole; Douglas J. Taylor; Everett G. Diederiks

(57) ABSTRACT

Lightly cooked cereal dough products are provided that are fortified with at least a 0.3% calcium at least a portion of which is supplied by $CaCO_2$ exhibiting reduced discoloration such as RTE cereals and grain based snacks. The dried cereal finished products are fabricated from cooked cereal doughs that can comprise rice and/or corn and minor levels of other conventional cereal ingredients and calcium carbonate. The cooked cereal doughs additionally contains effective amounts of calcium sequestrants. Methods for preparing such calcium fortified cooked cereal compositions and dried cereal finished food products are: A. providing a lightly colored calcium fortified cooked cereal dough or mass containing at least 0.3% calcium (dry weight basis) at least a portion of which is supplied by calcium carbonate and sequestrants; B. forming the lightly colored calcium fortified cereal dough into pieces; and, C. drying the pieces to form the present rice based finished food products fortified with high levels of calcium.

38 Claims, No Drawings

CALCIUM FORTIFIED CEREAL PRODUCT AND METHOD OF PREPARATION

FIELD OF THE INVENTION

The present invention is directed generally to food products and to their methods of preparation. In particular, the present invention is directed to improved Ready-To-Eat cereal products fortified with a nutritionally fortifying ingredient such as calcium and to processes for making such improved fortified cereal products.

BACKGROUND

Ready-To-Eat ("RTE") breakfast cereals have long been fortified with various vitamins and minerals. Health and nutrition interests have recently focused upon increasing the calcium content of foods and in RTE cereals in particular. The present invention provides improvement in the mineral fortification of cooked cereal products such as Ready-To-Eat cereals. More specifically, the present invention provides improvements in providing lightly colored RTE cereals fortified such as rice and/or corn based with high levels of calcium that are not discolored.

For adults, recent medical studies have indicated that a diet containing the U.S. recommended daily allowance (RDA) of calcium might be effective in preventing or mitigating osteoporosis, and also possibly high blood pressure and colon cancer. Calcium is also of particular nutritional value in growing children to support bone growth. There is therefore great public interest in the consumption of food products that will supply the recommended daily allowance of calcium.

In view of the desire for introducing more calcium into diets, especially children's diets, it would be desirable if such RTE cereal products were fortified with supplemental calcium to provide a significantly nutritionally enhanced product. By significantly nutritionally enhanced is meant a product having at least 10% of the current recommended daily allowance ("RDA") or at least 100 mg of calcium per serving (typically 25 to 35 g of product) of RTE cereal.

Calcium can be added in limited amounts to RTE cereal products. However, at higher levels of calcium fortification, the presence of such high amounts of calcium can adversely interfere with other desired characteristics. For example, high levels of added calcium materials could negatively affect the taste, texture and density of the RTE cereal products. More importantly, for lightly colored cereals such as than that are rice and/or corn (maize) based, calcium fortification can result in development of off-colors.

RTE cereal products fabricated from rice and/or corn based cooked cereal doughs such as Rice Chex™, Corn Chex™, or Honey Nut Chex™, (a rice and corn based RTE cereal) are very popular. Such rice and/or corn base products are popular in part due to their light coloration and light airy texture. The combination of their rice and/or corn flavor as well as their light color and texture are particularly pleasing. A good description of techniques for forming such RTE cereal products is given in U.S. Pat. No. 2,600,532 entitled "Method for Manufacture of Cereal Food Products" (issued Jun. 17, 1952 to D. Hule et al.) and U.S Pat No. 2,743,685 entitled "Apparatus for Manufacturing a Cereal Food Products" (issued May 1, 1956 to D. Hale et al.) each of which is incorporated herein by reference.

In view of the current interest in providing RTE cereals having high levels of calcium fortification, it would thus be desirable to provide RTE cereal products fabricated from rice and/or corn based cooked cereal doughs fortified with supplemental calcium to provide a significantly nutritionally enhanced product. Calcium carbonate at 40% dry weight calcium is potentially a good ingredient to employ to provide desired calcium fortification. Unfortunately, however, RTE cereal products fabricated from lightly colored cereal doughs such as but not limited to rice and/or corn based cooked cereal doughs fortified with high levels of calcium supplied by calcium carbonate can develop an undesirable green or grey discoloration.

One technique for addressing this discoloration is to add coloring agents or other colored ingredients to mask or darken the cereal. However, it would be desirable to provide RTE cereal products that exhibit the familiar and desirable light color which nonetheless posses high levels of calcium fortification. Another technique to provide RTE cereal products that are naturally darker such as those that are wheat based. The dark brown color of the wheat-based products naturally masks any discoloration that can occur.

It would thus be desirable to be able to calcium fortify RTE cereal products fabricated from lightly colored cooked cereal doughs to provide high levels of calcium fortification while minimizing discoloration and maintaining a light coloration.

The present invention is directed towards the provision of improved R-T-E cereal products fortified with high calcium levels of superior appearance and reduced discoloration. The present invention resides in part in the additionally including particular levels of sequestrants into a lightly colored cooked cereal dough formulation, cooking the calcium and sequestrant containing cereal ingredients to form cooked cereal doughs of reduced discoloration and forming such cooked cereal doughs into finished RTE cereal products.

The present invention further resides in part in the selection of calcium material of particular type and size to provide the desired calcium fortification.

SUMMARY OF THE INVENTION

In its product aspect, the present invention provides light cooked cereal compositions such as cooked cereal doughs fortified with at least a 0.3% calcium at least a portion of which is supplied by $CaCO_2$ that exhibit reduced discoloration and further provides dried finished cereal food products fabricated therefrom such as RTE cereals and grain based snacks.

The dried cereal finished products are fabricated from lightly colored cooked cereal doughs that can comprise rice and/or corn and minor levels of other conventional cereal ingredients and at least 0.3% calcium (dry weight basis) cereal supplied in part by calcium carbonate. The cooked cereal doughs additionally essentially comprise effective amounts of calcium sequestrants. Notwithstanding high concentrations of the calcium, the finished fortified cereal products are not only organoleptically desirable but also almost indistinguishable from their unfortified counterparts especially in terms of color appearance.

In its method aspect, the present invention resides in as methods for preparing such calcium fortified cooked cereal compositions and dried cereal finished food products.

In the preferred embodiment, the methods of providing finished products essentially comprise the steps of:

A. Providing a lightly colored calcium fortified cooked cereal dough or mass containing at least 0.3% calcium (dry weight basis) at least a portion of which is supplied by calcium carbonate and sequestrants;

B. Forming the lightly colored calcium fortified cereal dough into pieces; and,

C. Drying the pieces to form the present rice based finished food products fortified with high levels of calcium.

DETAILED DESCRIPTION OF THE INVENTION

The present invention relates to cooked cereal doughs containing defined levels calcium at least partially provided by calcium carbonate, to finished dried cooked cereal dough based products prepared therefrom such as RTE cereals, and to methods for the preparation of the doughs and finished products. Each of these product constituents, as well as methods for their preparation and use are described in detail below.

Throughout the specification and claims, percentages are by weight and temperatures in degrees Fahrenheit, unless otherwise indicated.

The present invention is particularly suitable for providing calcium fortified lightly colored cooked cereal dough of equivalent color to doughs not fortified with the levels of calcium herein. Cooked cereal doughs can be simply characterized as "light" or "dark" on the familiar Hunter color scale wherein pure white has a value of 100 and pure black has a value of zero. A rice-based RTE cereal typically will have a color value of between about 55 to 63 depending in part upon the degree of toasting. A corn-based cereal can have a Hunter color value ranging from about 55 to 60. A 50:50 rice and corn blend RTE cereal can have an intermediate value. By "lightly colored" cooked cereal dough or finished product herein is meant a product having a color value ranging above 51, or more practically, about 60 to 90 on the Hunter color scale. In contrast, a darker cooked cereal dough such as prepared from whole red wheat can have a Hunter color value of about 40 to 50.

Useful herein to measure the color of an cereal product is a spectrophotometer such as a LabScan XE spectrophotometer manufactured by HunterLab, 11491 Sunset Hills Road, Reston, Va. U.S.A. 22090. The spectrophotometer measures color on an L, a, and b axis. The L axis measures the light to dark on a scale of 0–100, 0 being the darkest and 100 the lightest. The a and b axes measure the color hue. The measurement procedure is the manufacturer's recommended procedure.

In one preferred embodiment of providing lightly colored cooked cereal doughs and finished products therefrom, the principle essential component of the present cereal compositions is rice and/or corn. The rice component can be provided from whole grain rice or brown rice, or, preferably from white or polished rice. The rice component can be provided by whole rice pieces such as whole white rice, cut rice grain pieces, rice flour or other rice ingredients, e.g., blends of variously sized rice components. The rice component can also include blends of white rice, e.g., rice flour, and rice bran, if desired. The corn (maize) component can be similarly provided by whole grain, corn, corn grits, corn cones, corn flours, and mixtures thereof. When corn is the sole or principal grain ingredient, mesa corn (i.e. alkaline treated) can be selected to provide its distinctive flavor. In preferred embodiments, the rice and/or corn ingredient(s) comprise about 40 to 97% (dry weight basis) of the cooked cereal dough. In more preferred embodiments, the rice and/or corn ingredients comprise about 75 to 95% (dry weight basis) of the cooked cereal dough. For best results the rice and/or corn ingredients comprise about 80 to 95% of the present cereal products.

In still other variations, the present lightly colored cooked cereal doughs can comprise white wheat, especially those white hard wheat varieties that have recently become more widely available such as, but not limited to, from the species *Triticum aestivium.* In such wheat containing products preferably the wheat content ranges from about 1 to 30 with the balance of the cereal ingredients being supplied by the lightly colored rice and/or corn.

In still other variations, the lightly colored cooked cereal dough can comprise those bleached wheat grains and grain products such as whole flours that are described in copending commonly assigned U.S. Ser. No. 09/392,699 filed Sep. 9, 1999 by Lloyd Metzger entitled "Bleached Grain and Grain Products and Methods of Preparation" which is incorporated herein by reference. In that application, cereal grains such as whole grain wheat kernels (whether hard or soft, red or white and especially hard white) are bleached with hydrogen peroxide to bleach or whiten the bran layer. Bleached whole grain kernels and milled grain products such as whole flours are provided having the white color and bland flavor of conventional white or patent flour.

In other less preferred embodiments, the principal rice and/or corn ingredient is partially substituted or blended with other or supplemental starchy cereal components. The supplemental starchy cereal component can optionally further comprise any conventionally employed starchy cereal or, synonymously, farinaceous material, for use in a ready-to-eat cereal. Exemplary suitable starchy cereals include cereal grains, cut grains, grits or flours from wheat, corn, oats, barley, rye, triticale or other cereal grains and mixtures thereof. The flours can be whole flours or, preferably flour fractions such as with the germ fraction or husk fraction removed. Of course, the R-T-E cereal art is well developed and the skilled artisan will have no difficulty selecting suitable farinaceous materials for use herein.

Care however, must be taken to insure that the selection of type and amount of cereal components is made so as to provide a lightly colored cooked cereal dough. In certain embodiments, the rice and/or corn ingredient comprises at least 50% of the cooked cereal dough (dry weight basis). In less preferred embodiments having higher levels of supplemental cereal ingredients, the rice ingredient is present in the cooked cereal dough at levels ranging from about 10% to less than 50% (dry weight basis).

Calcium The present cooked cereal doughs and finished food products fabricated therefrom further essentially comprise a calcium ingredient to provide the desired calcium enrichment wherein at least a portion of the calcium is supplied by calcium carbonate $CaCO_2$.

Good results are obtained when the products comprise sufficient amounts of calcium ingredients to provide the total calcium content (including both native calcium associated with ingredients, with water, and added calcium) of the composition to provide at least 10% of the current recommended daily requirement of calcium per serving. Generally, the cooked cereal dough compositions comprise at least about 100 mg per 33 g serving (dry basis) (i.e., about 0.3% by weight, dry basis) of calcium, preferably about 0.30% to 1% (by weight, dry basis), and more preferably about 0.5% to 1% calcium.

Higher calcium concentrations in the cooked cereal dough are desired when sugar coated RTE cereal pieces are provided. Sugar coating generally comprises about 20% to 35% of the finished product. Thus, to provide the desired levels of calcium (e.g., 0.3%) in the finished product, e.g., a sugar coated RTE cereal, the concentration of calcium in the base piece, must be higher to compensate for the sugar coating.

At least a portion of the calcium level is essentially supplied by calcium carbonate $CaCO_2$. Calcium carbonate comprises about 40% calcium. While expensive, food grade calcium carbonate obtained by chemical reaction processes is desirable due to low levels of impurities, a good, inexpensive source of calcium carbonate from natural sources is ground limestone. Care should be exercised in selecting sources of ground limestone that are low in trace metals, especially such heavy metals such as lead. In particular, it is desirable that the ground limestone has trace metal concentrations of less than 10 PPM. Useful levels of calcium carbonate range from about 0.75% to 15% in the finished product. Such calcium material levels insure that the calcium content in the finished product ranges from about 100 mg per serving.

If desired, the cooked cereal doughs and finished products prepared therefrom can further comprise supplemental calcium fortification from other less desirable insoluble calcium ingredients. Useful herein to supply the supplemental calcium levels are calcium ingredients that provide at least 20% of their weight of calcium. Useful herein to provide the supplemental calcium fortifications above that provided by CaCO2 are insoluble mineral calcium salts, particularly calcium phosphate salts. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic $(CaH_4(PO4)_2 \cdot H_2O)$, dibasic $(CaHPO_4 \cdot 2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%).

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2 \cdot Ca(OH)_2$. This product provides assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

The skilled artisan will appreciate that while $CaCO_2$ and these calcium phosphate salts are characterized herein as insoluble, of course, some small percentage will dissolve in water depending in part upon the temperature and pH.

Soluble calcium salts typically are expensive and contain low weight percentages of calcium. While calcium chloride is an exception to this generalization, addition of significant calcium levels supplied by calcium chloride imparts an unacceptable bitter flavor to cooked cereal dough. In addition, by adding sufficient amounts of many of these soluble calcium salts to achieve the desired fortification level, the finished product may exhibit an undesirably dry texture and gritty mouth feel. Thus, in highly preferred embodiments, the present food products are essentially free (i.e., less than 0.1%) of added soluble calcium salts.

The insoluble calcium ingredient regardless of source or type is further preferably characterized by a particularly fine particle size. Such a fine or flour form of the calcium ingredient provides a particle size such that the average particle size is less than 25 $\mu$m. Selection of such a fine particle size allows for inclusion of the particulate material without imparting an undesirable gritty mouthfeel.

Even more preferred for use herein are calcium ingredients having a mean particle of less than 15 $\mu$m and for best results less than 10 $\mu$m. A good material, for example, is ground limestone of high purity having an average particle size of 3.8 $\mu$m available from Pluess-Stauffer (California), Inc. (Lucerne Valley, Calif.).

Sequestrant

It has been unfortunately found that fortification of lightly colored cooked cereal doughs with calcium carbonate at the levels of calcium fortification herein can undesirably result in the development of an off color in the cooked cereal dough. Depending in part upon the particular grain ingredients the off color can be green or grey in color. While not wishing to be bound by the proposed theory, it is speculated herein that the calcium carbonate partially dissolves in the hydrated cereal ingredients during the cooking step. It is further speculated that upon dissolution, divalent calcium ions react with a phytic acid constituent in grains leading to development of the off color.

The present cooked cereal doughs and finished food products fabricated therefrom further essentially comprise effective amounts of a calcium sequestrant to prevent discoloration of the lightly colored cooked cereal doughs. Addition of the sequestrant herein binds up the dissolved calcium ions preventing reaction with the phytic acid.

Suitable materials for use herein as the calcium sequestrants useful herein include phosphate salts such as sodium hexametaphosphate ("SHMP"), trisodium phosphate, disodium phosphate, tetrasodium pyrophosphate, polyphosphates; edible organic acids such as ascorbate, citric, maleic, maleic, tartaric, succinic, oxalic, citric, fumaric; ethylenediaminetetraacetate ("EDTA"), and mixtures thereof.

SHMP is the preferred calcium sequestrant primarily because SHMP can bind up to six Ca++ ions and thus is much more effective on a weight basis than the useful organic acid sequestrants. Thus, in preferred form at least a portion of the sequestrant is supplied by SHMP. Especially preferred for use as the sequestrant is a mixture of sodium ascorbate and sodium hexametaphosphate ("SHMP") in a 1 to 5:1 weight ratio.

The organic acids can be added in pure form or, preferably as their water-soluble salts, e.g. sodium citrate.

Good results are obtained when the sequestrant(s) ranges for example, about 0.005% to 0.05%, preferably about 0.025% to 0.05% (dry weight basis).

The problem of discoloration is evident when $CaCO_2$ is used to provide calcium mineral fortification, but surprisingly, not with the calcium phosphate salts described above. Again while not wishing to be bound by the proposed theory, it is speculated that these materials have enough ionic phosphorous when partially dissolved to complex with any divalent calcium ions sufficiently to prevent significant discoloration in the grain based cooked cereal dough. Thus, in a less preferred embodiment wherein the lightly colored calcium fortified cooked cereal doughs are free of $CaCO_2$, sequestrant addition can also be and preferably is avoided.

Moisture

The present cooked cereal dough food products herein range in moisture broadly from about 1 to 35% moisture. The amount of moisture depends, in part, upon the particular cereal ingredients, desired intermediate or finished products, cooking equipment and drying techniques employed.

The cooked cereal dough products generally has a moisture content of about 22% to 35% moisture, preferably about 26% to 29%. Cereal pellets and/or half products generally range in moisture from about 10% to 18% moisture. Half products that are shipped to separate locations for further processing into finished products such as fried snacks preferably range from about 10% to 14% moisture to provide shelf stable products. Pellets used in RTE cereal plants that are typically further processed in short order and thus that do not require shelf stability can range from about 10% to 18% moisture. Finished dried RTE cereals can have moisture contents of about 2% to 5% while fried snack products can be 1% to 3% moisture.

Within this broad moisture range, particular preferred moisture ranges can be selected in important part upon the particular cooking technique and equipment selected. For extruder cookers, e.g., twin screw extruders, the preferred moisture content ranges from about 22 to 28%. When batch pressure cookers are employed such as is described in the '532 and/or '685 patents the moisture content is generally higher and ranged from about 26 to 30%, and most preferably about 26–28%.

Supplemental Ingredients

In more preferred embodiments, if desired, the present cereal dough composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% dry weight of the cereal composition.

One especially useful material is common salt. Desirably, the salt comprises about 0.1 to 4%, preferably about 0.5 to 3.0% of the cereal composition.

The present cooked cereal dough products can optionally additionally comprise minor amounts such as 1% to 30%, preferably about 1% to 12%, of one or more supplemental starchy cereal components. The starchy cereal component can comprise any conventionally employed starchy cereal or, synonymously, farinaceous material, for use in a ready-to-eat cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk fraction removed or, alternatively, brans. For those embodiments to be fabricated into puffed cereal pieces the supplemental ingredient can for example comprise pure starches or pure modified starches to assist in providing desired puff volumes. Of course, the R-T-E cereal art is well developed and the skilled artisan will have no difficulty selecting suitable farinaceous and/or starchy materials (e.g., potato starch) for use herein.

If desired, the present cooked cereal dough food products can additionally comprise about 0.1% to about 20% (dry weight), preferably about 1% to 10%, and most preferably about 5% to 10% by weight sugar(s) or, synonymously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

In a preferred embodiment for ready-to-eat cereals, the present cereal compositions are further essentially defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein.

It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein. More heat tolerant vitamins can be added to the other cereal ingredients that form the cooked cereal dough.

Method of Preparation

In the preferred embodiment, the present methods essentially comprise a first step of providing a light colored cooked cereal composition such as a cereal dough or cereal mass containing calcium and sequestrant each within the herein their respective specified ranges.

Cooked cereal dough can be prepared by blending various dry cereal ingredients together with water and cooking to gelatinize the starchy components and to develop a cooked flavor. Preferably, a preblend of wet ingredients is made and combined with a preblend of the dry ingredients. The cooked cereal material or mass can also be mechanically worked to form cooked cereal dough. The cooking and mechanical work can occur simultaneously or sequentially. The dry ingredients can also include various cooked cereal dough additives such as sugar(s), salt and mineral salts, and starches. In addition to water, various liquid ingredients such as corn (maize) or malt syrups can be added. A cooked cereal mash is quite similar to cooked cereal dough except that larger sized particles such as whole grains or cut grains are cooked rather than cereal flour ingredients.

The calcium carbonate and the sequestrant(s) can be added in whole or in part to either the dry or wet blend. Surprisingly, in a preferred variation add calcium carbonate and sequestrant at each added at least in part, and preferably entirely to the wet ingredients to insure that the sequestrant is more intimately admixed with the calcium.

Moreover, while the invention finds particular suitability for use in connection with the provision of R-T-E cereals fabricated from calcium fortified cooked cereal doughs, the skilled artisan will appreciate that the present calcium fortified cooked cereal doughs can find applicability for use in connection with other grain based food products such as grain based snack products. For example, the calcium fortified cooked cereal doughs can be formed into suitably sized, shaped and partially dried pellets or half products. These half products are useful intermediate products. Finished grain based snack products are usually provided by the deep fat frying or other puffing of the pellets (e.g., hot air or microwave heating) of partially dried half products fabricated from cooked cereal doughs. An advantage of half products is that they can be produced in bulk in one location and thereafter fried in one or more finish operations to form the finished snack products. Not only are shipping costs reduced due to the reduced volume of the half products compared to the finished products but also breakage of the finished product is reduced. Also, the present invention can be used to provide pretzel snack products fortified with calcium.

The cereal dough cooking step can be practiced using a batch, atmospheric cooker and a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

Forming into Desirably Shaped and Sized Pieces

The present methods further essentially comprise the step of forming the cooked cereal dough or mass into individual pieces of desirable shape and size. Conventional techniques and equipment can be employed to practice this step and the skilled artisan will have no difficulty in selecting those suitable for use herein.

For example, the dough having a moisture content of about 25% to 30% is first partially dried to a partially dried dough having a moisture content of about 12% to 20%. The partially dried dough can then be fed to piece forming apparatus that form the partially dried dough into individually shaped and sized pieces.

The present cereal compositions can be fabricated into any of a variety of common R-T-E cereal or snack forms including, shreds, biscuits, flakes, rings, or any common R-T-E cereal or cereal based snack product form, shape or size. The present cereal compositions can also be formulated and fabricated so as to provide puffed cereals of various shapes and sizes such as "biscuits". Especially desirable for use herein are biscuits, especially toasted biscuits. Especially for flakes, the forming step can first involve a substep of shaping the dough into pellets and then a finish substep of shaping the pellets into a final desired shape such as flakes.

For example, the cooked cereal dough can be fed to a pellet former to form pellets. In the preparation of R-T-E cereals in flake form, the pellets can be sized to have a pellet count of about 35 to 50 per 10 g and a moisture content of 16 to 20%. In the preparation of a flaked R-T-E cereal, the pellets can be partially dried to moisture contents of about 18 to 20%. The pellets can then be formed into "wet" flakes having a thickness of about 380 to 635 $\mu$m (0.015 to 0.025 inch), preferably while warm 76.6 to 87.8° C. (170 to 190° F.) to form desirably shaped and sized wet flakes.

In still another variation, the dough can be sheeted to form sheets of dough (e.g., 25 to 800 microns in thickness) and the individual pieces formed by cutting the sheet into individual pieces or by stamping out shaped pieces from the dough sheet.

In still another variation, the cooked cereal dough can be extruded through a die imparting a desired peripheral shape to form an extrudate cooked cereal dough rope. The dough rope can be cut to form individual shaped pieces.

In still another variation, the cooked cereal dough can be fed to a biscuit forming device (see, for example, U.S. Pat. No. 5,342,188, entitled "Device For Crimping and Cutting Dough Ropes," issued Aug. 30, 1994 to C. E. Zimmermann, which is incorporated herein by reference) which forms the dough into biscuit shaped individual pieces.

In another preferred variation, the cooked cereal dough is formed into individual "O" shaped pieces or rings, biscuits, shreds, figurines, letters, spheres or flakes or other geometric shapes, nuggets, or even irregular shapes.

Drying To Form Finished Pieces

The present methods further comprise the step of drying the shaped and sized individual pieces to form finished cereal products fortified with calcium.

The skilled artisan will appreciate that the drying step depends importantly in part upon the desired end product. For example, for end products in the form of puffable half products or pellets for snack production, the drying step can be practiced to provide a "finish" moisture content of about 10 to 15%. However, when the desired end product is an R-T-E cereal, drying the pellets to these moisture contents may only be an intermediate or substep prior to, for example, flaking the dried pellets to form "wet" flakes. These "wet" flakes can then be subjected to a finish or final drying step wherein the pieces are dried to final dried moisture contents of 1 to 4% such as by toasting.

In still another variation, the dough can be extruded under conditions of temperature and pressure so as to puff and expand (the "direct expansion" technique) and sectioned or cut into individual pieces to form individual expansions puffed R-T-E cereal or snack pieces.

In certain embodiments, the cooked cereal dough can be puffable such as by deep fat frying, microwave heating, gun puffing, jet zone heating, etc.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

In still another variation, the pieces or pellets can be deep fat fried to form dried puffed fried finished cereal products fortified with calcium. Such dried puffed fried finished cereal pieces are especially desirable as calcium fortified snack products. Such products can absorb about 5 to 35% of frying fat during the drying and puffing step.

The dried cereal pieces, however realized, can optionally be provided with a topical sugar coating and subsequently dried to remove the moisture added by the sugar coating solution to form presweetened R-T-E finished cereal pieces. In other variations, an oil topical coating optionally with salt and/or flavors, is applied to form finished dried snack products. Both conventional sugar coatings and coatings employing high potency sweeteners, especially aspartame and potassium acesulfame, are known and can be used to provide presweetened cereals for use herein.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100 and for best results about 25:100 to about 35:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

The R-T-E cereal pieces so prepared can then be conventionally packaged for distribution and sale.

In still other variations, the present finished dried food products are admixed with other dry snack ingredients (e.g., peanuts, pretzels, and other cereal pieces) to form a mixed aggregate snack product.

The finished dried R-T-E cereal and cereal based snack products fabricated from the calcium fortified cooked cereal doughs herein are useful as nutrient fortified food products. Surprisingly, the finished R-T-E cereal and cereal-based snack products provided herein are remarkably similar to their unfortified counterparts, even though containing the added calcium ingredient. Good flavor, good texture and other favorable organoleptic attributes characterize the products. Notwithstanding their highly acceptable taste, appearance and texture attributes, the products are nonetheless characterized as having high levels of calcium. The present finished products are remarkably free of the undesirable discoloration heretofore associated with finished light colored dried cereal products high in calcium content. The cooked cereal doughs and finished products prepared therefrom can each further be characterized by a Hunter value of greater than 60. If desired, the finished products can also be subjected to a toasting step.

The products can be packaged and distributed in conventional form.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. Calcium fortified cooked cereal food product comprising:
   A. a lightly colored cooked cereal dough product having a moisture content of about 1% to 30%;
   B. sufficient amounts of calcium carbonate to provide a total calcium content of at least 0.3% (dry weight basis);
   C. about 0.005% to 0.05% of the cooked cereal dough product of a calcium sequestrant, wherein at least a portion of the calcium sequestrant is sodium hexametaphosphate.

2. The food product of claim 1 wherein the calcium sequestrant includes an additional portion selected from the group consisting of phosphate salts, edible organic salts, EDTA and mixtures thereof.

3. The food product of claim 2 wherein the calcium sequestrant is a mixture of the additional portion and the sodium hexametaphosphate in a 1 to 5:1 ratio.

4. The food product of claim 3 wherein at least a portion of the calcium carbonate is supplied by ground limestone.

5. The food product of claim 4 wherein the ground limestone has a metal concentration of 10 PPM or less.

6. The food product of claim 2 wherein the food product is in the form of a dough having a moisture content of about 25% to 30%.

7. The food product of claim 2 wherein the food product is in the form of cooked cereal dough pellets or half products having a moisture content of about 10% to 18%.

8. The food product of claim 2 wherein the food product is in the form of cooked cereal dough RTE cereals having a moisture content of about 3% to 5%.

9. The food product of claim 8 additionally comprising a sugar coating.

10. The food product of claim 2 wherein at least a portion of the calcium sequestrant is an edible organic acid.

11. The food product of claim 10, wherein at least a portion of the edible organic acid is provided in the form of a water-soluble salt.

12. The food product of claim 1 wherein at least a portion of the calcium carbonate is supplied by ground limestone.

13. The food product of claim 12 additionally comprising supplemental insoluble calcium material in a quantity sufficient to bring the total calcium content of the food product composition to from about 0.6% to 20% by weight (dry basis).

14. The food product of claim 12 wherein the calcium carbonate has an average particle size of no larger than 25 microns.

15. The food product of claim 1 wherein the lightly cooked cereal dough comprises about 40% to 97% rice, corn (maize) and mixtures thereof.

16. The food product of claim 15 wherein the lightly cooked cereal dough comprises about 40% to 97% rice.

17. The food product of claim 16 in the form of biscuits.

18. The food product of claim 15 wherein the lightly cooked cereal dough comprises about 40% to 97% corn.

19. The food product of claim 1 wherein the light cooked cereal dough product has a Hunter L color value of about 60.

20. A method of providing calcium fortified cooked cereal dough products, comprising the steps of:
   A. providing a lightly colored calcium fortified cooked cereal dough or mass containing at least 0.3% calcium (dry weight basis) at least a portion of which is supplied by calcium carbonate and about 0.005% to 0.005% of calcium sequestrant, wherein at least a portion of the calcium sequestrant is constituted by sodium hexametaphosphate;
   B. forming the lightly colored calcium fortified cereal dough into pieces; and, C. drying the pieces to form finished food products fortified with high levels of calcium.

21. The method of claim 20 wherein the calcium sequestrant includes an additional portion selected from the group consisting of phosphate salts, edible organic acids, EDTA and mixtures thereof.

22. The method of claim 21 wherein at least a portion of the calcium sequestrant is an edible organic acid.

23. The method of claim 22 wherein at least a portion of the calcium carbonate is supplied by ground limestone.

24. The method of claim 23 wherein the calcium carbonate has an average particle size of no larger than 25 microns.

25. The method of claim 21 wherein the calcium sequestrant is a mixture of the additional portion and the sodium hexametaphosphate in a 1 to 5:1 ratio.

26. The method of claim 20 wherein the food product is in the form of cooked cereal dough pellets or half products having a moisture content of about 10% to 18%.

27. The method of claim 20 wherein the food product is in the form of cooked cereal dough RTE cereals having a moisture content of about 3% to 5%.

28. The method of claim 20 wherein the light cooked cereal dough comprises about 40% to 97% rice, corn (maize) and mixtures thereof.

29. The method of claim 20 wherein the light cooked cereal dough comprises about 40% to 97% rice.

30. The method of claim 20 drying the cooked cereal dough to a moisture content of 10% to 20% prior to forming into pieces.

31. The method of claim 20 wherein at least a portion of the edible organic acid is provided in the form of a water soluble salt.

32. The method of claim 20 additionally comprising supplemental insoluble calcium material in a quantity sufficient to bring the total calcium content of the food product composition to from about 0.6% to 20% by weight (dry basis).

33. The method of claim 20 wherein the dough comprises about 5% to 10% sugar.

34. The method of claim 20 additionally comprising the step of toasting.

35. The method of claim 20 additionally comprising the step of applying a sugar topical coating.

36. The method of claim 20 wherein at least a portion of the sequestrant is provided by sodium ascorbate.

37. The method of claim 20 wherein calcium carbonate comprises about 0.5% to 1% (dry weight basis) of the cooked cereal dough.

38. The method of claim 20 wherein in step B, the cereal pieces are formed into the biscuits.

* * * * *